(12) United States Patent
Carkner et al.

(10) Patent No.: US 6,271,605 B1
(45) Date of Patent: Aug. 7, 2001

(54) BATTERY DISCONNECT SYSTEM

(75) Inventors: Steven Carkner; Quang Luong, both of Waterloo; Jonathan Malton, Kitchener; Robert Lowles, Waterloo; Carl Schaaff, Guelph; Daniel Fischer, Waterloo, all of (CA)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 09/343,373

(22) Filed: Jun. 30, 1999

Related U.S. Application Data
(60) Provisional application No. 60/132,391, filed on May 4, 1999.

(51) Int. Cl.[7] .................................................. H02J 7/00
(52) U.S. Cl. .............................. 307/125; 307/86; 307/140
(58) Field of Search ..................................... 307/125, 130, 307/139, 140, 150, 85, 86; 320/114, 115, 132, 138; 340/636, 693.1, 693.2, 693.3

(56) References Cited

U.S. PATENT DOCUMENTS

| | | | |
|---|---|---|---|
| 5,818,203 | * 10/1998 | Narita | 320/128 |
| 6,002,240 | * 12/1999 | McMahan et al. | 320/150 |
| 6,133,711 | * 10/2000 | Hayashi et al. | 320/128 |

* cited by examiner

*Primary Examiner*—Fritz Fleming
(74) *Attorney, Agent, or Firm*—Jones, Day, Reavis & Pogue; Charles B. Meyer, Esq; Krishna K. Pathiyal, Esq.

(57) ABSTRACT

A battery disconnect system is provided for a device having a battery and load. The battery disconnect system includes a switch that is operative to connect the battery to the load when the switch is in a closed state. The switch is also operative to disconnect the battery from the load when the switch is in an open state. The battery disconnect system also includes a switch controller that is coupled to the switch. The switch controller is operative to cause the switch to enter the closed state in response to receipt of a first signal from a first external source. The switch controller is also operative to cause the switch to enter the open state in response to receipt of a second signal from a second external source.

55 Claims, 3 Drawing Sheets

BATTERY DISCONNECT SYSTEM

This application claims the benefit, under 35 U.S.C. §119(e), of United States Provisional Application Ser. No. 60/132,391 filed May 4, 1999.

BACKGROUND OF THE INVENTION

The present invention is directed toward the field of battery protection systems. In particular, the invention is directed to a battery disconnect system for disconnecting a battery from its load during long periods of inactivity to reduce the likelihood that the battery will become damaged due to excessive battery discharge.

Many batteries such as rechargeable batteries may be irreparably damaged if they are discharged too deeply. Lithium-based batteries are especially susceptible to this hazard.

Many devices having built-in rechargeable batteries can expose their rechargeable battery to this excessive discharge hazard. Even when not in use, the rechargeable battery remains connected to the device's load. The small load the device presents to the rechargeable battery during inactive periods will cause the rechargeable battery to slowly discharge, potentially damaging the battery.

This problem is amplified when devices having rechargeable batteries are transferred from a manufacturer to a retailer. Prior to being sold to an end-user, the device may be warehoused or placed on shelves for weeks or months before the end-user first uses the device. The period of time that the device remains in the warehouse or on the retailer's shelf may be sufficient to allow the battery to become over-discharged and damaged. To alleviate this problem, it is desirable to have a method of preventing the device from over-discharging during periods of long inactivity.

One method of addressing this problem has been for manufacturers to position plastic tabs between the battery and the power terminal to physically disconnect the load from the battery. Upon purchase of the device, the customer is then instructed to remove the tab thereby reconnecting the load to the device.

This method has many disadvantages. One disadvantage is that it poses significant impediments to the manufacturer's quality assurance program. During a quality assurance inspection, the tab must be removed to allow the inspector to test whether the product functions, and then must be reinstalled in the product, which may be extremely difficult. This method also can reduce the product's overall reliability due to the addition of mechanical controls. Another shortcoming is that the end-user has to ensure that the rechargeable battery is properly installed and connected after removal of the tab.

Other proposed methods include adding mechanical switches that can add significant resistance to the battery path thereby degrading performance. Also, the mechanical nature of the switches often results in a reduction of overall product reliability.

Another method of addressing the problem has been the use of commercially available Lithium battery pack protection circuits. These battery pack protection circuits measure the lithium cell voltage and disconnect the battery from the load if the battery voltage drops below 2.5 volts or other predetermined thresholds. One disadvantage of this method is that several hours are required for the battery to be charged back to a useable state after the battery pack protection circuit has disconnected the battery from the load—an unacceptable result for electronic devices that are designed to function with little, if any perceived downtime. Another disadvantage is that disconnecting the load after the battery voltage has dropped to a pre-determined level such as 2.5 volts does not guarantee that the battery will not be damaged. The battery will continue to discharge as a result of self-discharge and power drain from the protection circuit. Lithium cells become damaged if they are discharged below a low voltage level (typically 2.5 volts) for more than a few minutes. Consequently, the battery may still over-discharge when utilizing a load-disconnecting method that does not compensate for self-discharge and power drain and thereby does not protect against damage to the lithium cell.

Therefore, there remains a need in this art for a battery protection system that can disconnect the load from the battery to prevent the battery from over-discharging without the use of a removable mechanical interlock device. There remains a further need for a system that can disconnect the load from the battery before the battery has been significantly discharged.

SUMMARY OF THE INVENTION

The present invention overcomes the problems noted above and satisfies the needs in this field for a battery disconnect system that includes the feature of disconnecting a battery from its load while the battery is almost fully charged. The present invention provides a method for protecting the internal rechargeable battery in a device by electrically disconnecting the internal rechargeable battery from the load when the device will not be needed for a long time. The present invention further provides a method for quickly reconnecting the battery to the load in a manner that requires little action by the end-user.

The present invention is particularly useful for products that charge an internal, non-removable rechargeable battery from a primary user-replaceable battery or other user-connected external power source. This invention can conceal the fact that the product uses an internal non-removable rechargeable battery because the product can be constructed to appear to turn on and off when the primary user-replaceable battery is inserted or removed.

The present invention provides many advantages over the presently known battery protection systems. Not all of these advantages are simultaneously required to practice the invention as claimed, and the following list is merely illustrative of the types of benefits that may be provided, alone or in combination, by the present invention. These advantages include: (1) disconnecting the rechargeable battery based on a primary battery or external power source not being available for a programmed period of time; (2) disconnecting the rechargeable battery from a charging source when the rechargeable battery is nearly fully charged; (3) reconnecting the battery based on a primary battery or external power source being made available; (4) providing a method whereby a manufacturer can ship a device with an internal rechargeable battery fully charged and ready for use but with the rechargeable battery electrically disconnected from the load, and in which the user can electrically connect the rechargeable battery to the load in a few seconds by simply installing a primary battery or plugging in an external power source; (5) increasing the shelf life of a device having the invention; and (6) providing an over temperature safety disconnect.

In accordance with the present invention, a battery disconnect system is provided for a device having a battery and load. The battery disconnect system includes a switch that is operative to connect the battery to the load when the switch is in a closed state. The switch is also operative to disconnect the battery from the load when the switch is in an open state. The battery disconnect system also includes a switch controller that is coupled to the switch. The switch controller is operative to cause the switch to enter the closed state in response to receipt of a first signal from a first external source. The switch controller is also operative to cause the switch to enter the open state in response to receipt of a second signal from a second external source.

In one embodiment, the first external source is an external battery, the first signal is a pre-defined level of power generated by the external battery, the second signal is a logic signal, and the second external source is the load. In an alternate embodiment, the first external source is an AC power source instead of an external battery, and the first signal is either the actuation of a reset switch or the presence of an adequate power supply from the AC power source.

In accordance with the present invention a device is provided. The device includes a battery for providing power, a load configured to consume power provided by the battery, and a switch coupled between the battery and the load. The switch is operative to connect the battery to the load when the switch is in in a closed state. The switch is also operative to disconnect the battery from the load when the switch is in in an opened closed state. The device also includes a switch controller coupled to the switch. The switch controller is operative to cause the switch to enter the closed state in response to a first signal from a first external source. The switch controller is also operative to cause the switch to enter the open state in response to a second signal from a second external source.

In accordance with the present invention, a method of storing a device having an internal rechargeable battery and a load is provided. The method includes the steps of providing a switch in the device that is coupled between the internal rechargeable battery and the load, charging the internal rechargeable battery, and placing the switch in a state that electrically disconnects the internal rechargeable battery from the load.

In accordance with the present invention, a method for controlling the operating environment of a rechargeable battery in an electronic device is provided. The method includes the steps of providing a switch in the device that is operative to couple a load and the rechargeable battery, charging the rechargeable battery, and placing the switch in a state that electrically disconnects the rechargeable battery from the load.

In one embodiment the method also includes the steps of providing an external power source to the device, detecting the external power source, and placing the switch in a state whereby the rechargeable battery is electrically connected to the load.

In accordance with the present invention, a rechargeable battery system having a load and a rechargeable battery is provided. The rechargeable battery system comprises an electronically controllable switch for placing the rechargeable battery system into a first state or the second state wherein the rechargeable battery is electrically connected to the load when the rechargeable battery system is in the first state and the rechargeable battery is not electrically connected to the load when the rechargeable battery system is in said second state. The system also includes a switch controller operable to signal the switch to place the rechargeable battery system into the first state or the second state in response to the occurrence of a pre-defined condition.

BRIEF DESCRIPTION OF THE DRAWINGS

The present invention will become more apparent from the following description when read in conjunction with the accompanying drawings wherein.

DETAILED DESCRIPTION OF THE PREFERRED EMBODIMENT

Figure 1:
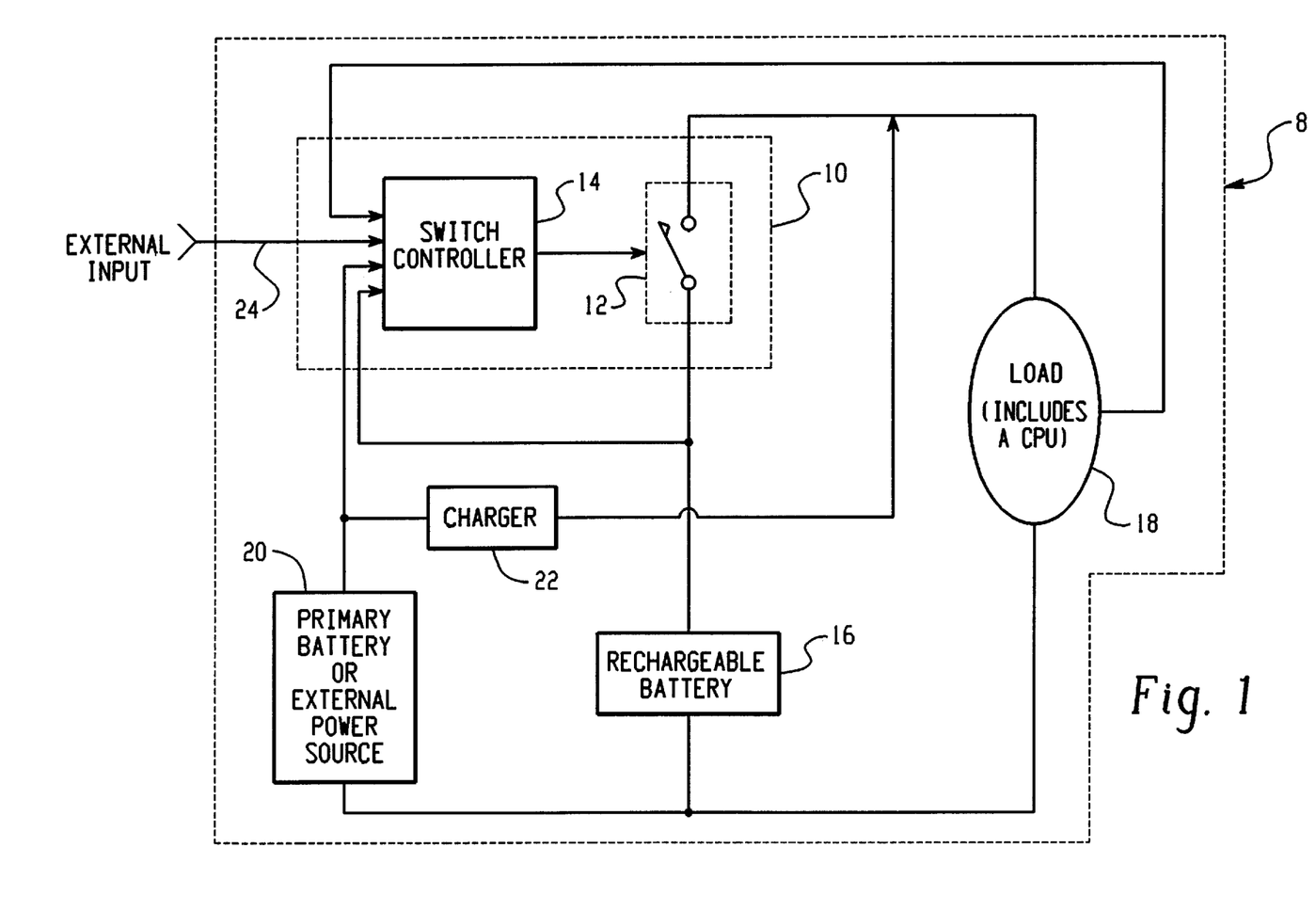
FIG. 1 sets forth a block diagram of the battery disconnect system installed in a device.

Referring now to the drawings, FIG. 1 is a schematic view of a preferred embodiment of the battery disconnect system 10 of the present invention which is implemented in an electronic device 8 in which a load draws upon a battery. Although the battery disconnect system 10 is particularly useful for electronic devices having rechargeable batteries such as wireless handheld communication devices (e.g., two-way pagers, one-way pagers, wireless e-mail devices, cellular telephones) cordless tools (e.g., drills, hedge trimmers, cordless screw drivers) and others, it may alternatively be used for devices that have non-rechargeable batteries.

The battery disconnect system 10 preferably comprises a switch 12 and a switch controller 14 which controls the operation of the switch 12. The switch 12 and switch controller 14 are coupled to a rechargeable battery 16 and electrical load elements 18 contained within the electronic device 8. The battery disconnect system 10 in one of its modes connects the rechargeable battery 16, which provides power to the electrical load elements 18, to the electrical load elements 18 and to disconnect the rechargeable battery 16 from the electrical load elements 18 contained within the electronic device 8. The load 18 comprises the circuitry that performs the functions carried out by the electronic device 8 and could include a CPU or other type of controller for controlling the circuitry of the electronic device 8.

The present invention is particularly useful with hand held electronic devices such as that described in commonly assigned U.S. patent application Ser. No. 09/1106585 filed Jun. 29, 1998, which is incorporated herein by reference. The hand held electronic device may include any combination of the following elements: a transmitter/receiver subsystem connected to a digital signal processor for digital signal processing of incoming and outgoing data transmissions, a power supply and power management subsystem for distributing and managing power to the device components, a microprocessor that controls the operation of the device, a display, memory, an output port, and a keyboard or other entry device.

The preferred battery disconnect system 10 also interfaces with a primary battery or external power source 20, which is used to charge the rechargeable battery 16 to a charged state. A charger 22 in the electronic device 8 transfers energy from the primary battery or external power source 20 to the rechargeable battery 16 during the charging process. The primary battery 20 could be an alkaline battery such as an AA alkaline battery or any other type of battery. The external power source preferably is rectified power from an AC power source such as rectified 110 VAC. The charger in this instance would be physically external to the device.

The battery disconnect system 10 responds to inputs from sources such as the rechargeable battery 16, the primary battery or external power source 20, load elements 18 such as a CPU within the load, or an external input 24. In response to the inputs, the battery disconnect system 10 either connects the rechargeable battery 16 to the load 18 so that the rechargeable battery 16 supplies power to the load 18 or alternatively disconnects the rechargeable battery 16 from the load 18 so that no energy is drained from the rechargeable battery 16.

The present invention has many advantages over current systems. In current electronic devices that use non-lithium-based rechargeable batteries, the device is shipped from the manufacturer with the rechargeable battery completely discharged so that the rechargeable battery does not become damaged if it remains unused for a long period of time prior to use by the consumer. But, before a consumer can use the device, the consumer must charge the battery for a long period of time of up to 24 hours.

In systems using lithium-based rechargeable batteries, devices are shipped with the rechargeable battery fully charged but mechanically disconnected from the load through the use of some type of mechanical interlock system. To use these devices, the consumer must first remove the mechanical interlock system and make sure that the rechargeable battery is properly connected to the device. These systems thus require the consumer to knowingly and actively undertake to connect the rechargeable battery prior to using the device and do not provide a method for the user to return the device to a storage condition prior to long periods of inactivity.

The present invention provides a method that is more user-friendly for the consumer. Before the device 8 is shipped by the manufacturer, the manufacturer can fully charge the rechargeable battery 16 and use the switch 12 and switch controller 14 to disconnect the battery 16 from the load 18. When the consumer is ready to use the device 8, the consumer merely installs the primary battery or external power source 20. In a matter of seconds, the controller 14 closes the switch 12 thereby making the device 8 ready for use with a fully charged rechargeable battery 16.

The preferred switch 12 is a MOSFET device, but a number of other devices could be used such as a BJT or IGBT, an electromechanical switch, an electro-optical switch, a vacuum tube, or others without departing from the spirit of the invention. With a MOSFET device as the switch 12, there may be some residual current flow even when the switch 12 is open, but the current flow is so small compared to the load current being disconnected and the normal self-discharging current of the rechargeable battery 16 that the residual current flow can be considered insignificant.

When the end user receives the device 8, the user will install a new primary battery 20 such as an AA alkaline cell or connect the device 8 to an external power source 20. The switch controller 14, based on this input, commands the switch 12 to close, and the device 8 will turn on. In the case where the primary battery 20 is installed, it appears to the user, as a result of logical controls on device 8 (preferably programmed in firmware on the device) that the device 8 is running exclusively from the primary battery that the user had just installed. This can reduce the confusion that can be generated when a user learns that a device 8 contains a second built-in battery 16. Once the CPU in the load 18 begins to operate, the CPU exerts a second signal to the switch controller 14 which, in turn, transmits a command to the switch 12 to remain in the closed state.

When the user removes the primary battery 20 (e.g., to change the battery) or when the user disconnects the external power source 20, the switch 12 does not immediately transition to the open state. Although one of the switch controller 14 input signals has been removed, the switch 12 remains closed because the signal from the load 18 remains present.

The length of time the device 8 continues to operate after the primary battery or external power source 20 is removed is a parameter to be determined by the manufacturer, and can be chosen to give the device 8 the "feel" of a slow loss of power or can be chosen to simulate a rapid loss of power. For example, in a pager having a primary battery 20, the pager could be programmed to cause the display to flash the message "low battery" for several seconds and then go blank upon removal of the primary battery 20. In this case, the switch 12 remains closed and will continue to supply power to the load 18. But, to the user the device 8 will appear to be powered off. When the user installs a new primary battery 20 in the device 8, the CPU will detect the new primary battery 8, and will re-enable the display. The load 18 will remain powered during this period thereby allowing realtime clocks in the device 8 to remain in-sync and stored data to remain in memory. Moreover, the user will not have to reboot or reset the device 8.

But, if the device 8 is to be stored for an extended period of time, the user can be instructed to remove the primary battery 20 or disconnect the external power source 20. The CPU will initially blank the screen as described above. After a preprogramed period of time (e.g., 24 hours), the load 18 signals the switch controller 14 to command the switch 12 to open thereby disconnecting the rechargeable battery 16 from the load 18. This allows the rechargeable battery 16 to be stored in a nearly fully charged state without a significant current drain thereby extending the life of the rechargeable battery 16.

The battery disconnect system 10 of the present invention provides another advantage over current battery protection systems. The battery disconnect system 10 allows the rechargeable battery 16 to be disconnected at any desired energy capacity level thereby reducing the likelihood of damage from over-drainage. The rechargeable battery 16 lasts significantly longer when it is stored in a fully charged state as opposed to being stored in a highly discharged state as employed by current battery protection systems that wait until the cell is totally discharged before disconnecting.

Optionally, the switch controller 14 could have an input that monitors the energy level of the rechargeable battery 16 as a fail safe provision. If the energy level falls below a preset level, the switch controller 14 could then command the switch 12 to transition to the open state thereby disconnecting the load 18 from the rechargeable battery 16 and preventing the rechargeable battery 16 from discharging further and becoming damaged.

Figure 2:
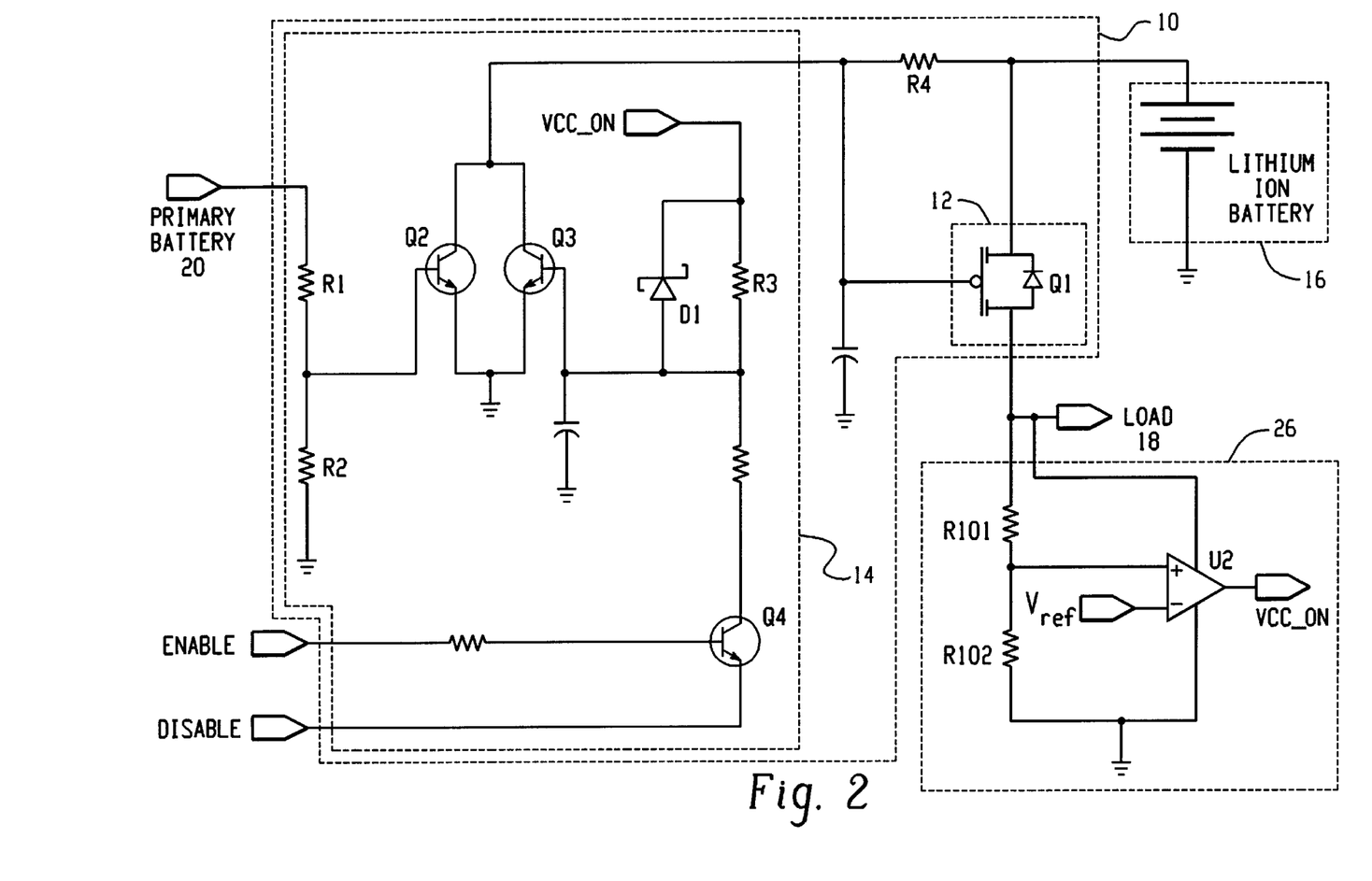
FIG. 2 sets forth a schematic view of a preferred embodiment of the battery disconnect system installed in a device.

A preferred implementation of battery disconnect system 10 of the present invention is shown in FIG. 2. The preferred battery disconnect system 10 is implemented in a pager device that uses a replaceable AA alkaline battery as the primary battery 20 to charge the rechargeable lithium battery 16.

The illustrated battery disconnect system 10 functions as follows. When the gate of transistor Q1 is pulled low by either or both transistors Q2 and Q3, the switch 12 is closed, thereby connecting the lithium battery 16 to the load 18.

Three conditions must be true in order to open switch 12. First, the voltage level of the primary battery 20 must be below a predetermined level as determined by the voltage divider R1/R2 and the base threshold voltage to turn on transistor Q2. The voltage level may be below the predetermined level due to either the primary battery 20 voltage being discharged below that level or the primary battery 20 being removed from the device 8. Second, the ENABLE signal must be set high and, third, the DISABLE signal must be set low. Both the ENABLE and DISABLE signals are used to prevent the switch 12 from spuriously closing if these signals become unstable when the load elements 18 are powering down after the switch 12 transitions to the open state.

The comparator U2 and the low voltage sense resistors R101 and R102 combine to form the low voltage cut-off circuit 26 that senses the lithium battery's 16 voltage as delivered to the load 18. The comparator U2 compares the voltage across the low voltage sense resistor R102 with a reference voltage Vref, and produces control signal VCC_ON, which becomes low as the load voltage falls below the preset level.

To open the switch 12, therefore, the primary battery 20 voltage must drop below a defined level. When this happens, transistor Q2 no longer conducts and stops pulling down the gate of transistor Q1. The switch 12 does not open at this point because the transistor Q3 is still conducting. The transistor Q3 conducts because its base is biased on through a pull-up resistor R3 that is coupled to the control signal VV_ON.

After a preprogrammed time period, preferably 24 hours in this embodiment, a load element 18 asserts the ENABLE signal high and the DISABLE signal low. This causes transistor Q4 to conduct pulling the base of transistor Q3 low. Because transistor Q3 no longer conducts, it stops pulling down the gate of transistor Q1. Consequently, the gate of transistor Q1 is pulled high by pull-up resistor R4 that is coupled to the rechargeable battery 16. As a result, switch 12 opens and the rechargeable lithium battery 16 is disconnected from the load 18. As the voltage presented to the load 18 falls after the switch 12 is opened, the detector 26 senses the falling voltage and sets the control signal VCC_ON, to a low level. This serves to hold the transistor Q3 off by holding the base of the transistor Q3 low through the diode D1, and preventing the transistor Q3 from turning on spuriously as indeterminate levels are present at the ENABLE and DISABLE signals as the CPU loses power.

Therefore when a user wants to store the device for a long period of time without use, the user need only remove the primary battery 20 from the system. The system will automatically disconnect the internal battery 16. Hence, the user need not know that the internal battery 16 exists.

The switch 12 is closed when a primary battery 20 having a sufficiently high output voltage is inserted into the device 8. A primary battery 20 with a sufficiently high voltage will cause transistor Q2 to conduct thereby pulling the gate of transistor Q1 low. Switch 12 will, as a result, connect the lithium battery 16 to the load 18.

When the load 18 is energized by the lithium battery 16, the control signal VCC_ON will be set high. Transistor Q3 will then conduct because its base will be biased on through pull-up resistor R3.

Figure 3:
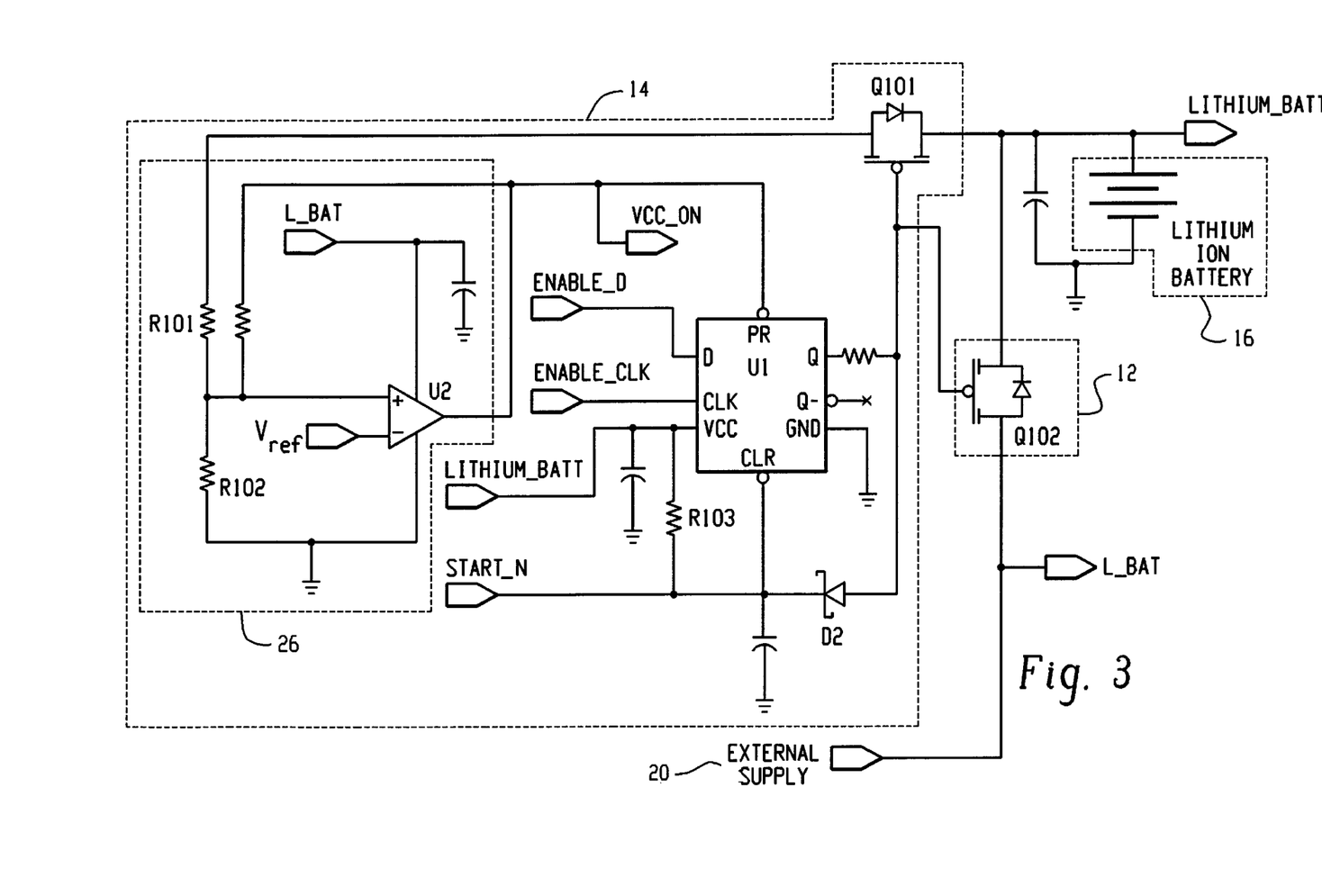
FIG. 3 sets forth a schematic view of an alternate embodiment of the battery disconnect system installed in a device.

A second preferred embodiment of the rechargeable battery disconnect system 10 of the present invention is shown in FIG. 3. In this embodiment, the device 8 uses an external power supply 20 (charger) to charge the internal lithium battery 16. The charger, in this embodiment, preferably physically resides outside the device. The switch 12 is implemented using a MOSFET device and the switch controller 14 comprises a flip-flop U1 and a comparator U2.

The switch 12 will transition from an open state to a closed state when the device 8 is connected to a functioning charger 20. The charger 20 causes the START_N signal to go low. This clears the flip-flop U1 causing transistors Q101 and Q102 to turn on. Transistor Q101 is preferably a field effect transistor and it connects the battery 16 to the low voltage sense resistors R101 and R102. Transistor Q102, also preferably a field effect transistor, is the switch 12 in this embodiment and connects the battery 16 to the L_BAT connection point, which, in turn, supplies power to the load 18.

To ensure proper functioning of the battery disconnect system 10, the CLR signal is pulled high through pull-up resistor R103 when the START_N signal is floating. The START_N signal floats when the charger 20 is not connected to the device 8 or when the charger 20 is malfunctioning.

The switch 12 can be commanded to the open state by various methods. First, by asserting the ENABLE_D signal high and causing the ENABLE_CLK signal to transition from a low signal level to a high signal level, the Q output of the flip-flop U1 will transition to a high state thereby turning off transistors Q101 and Q102 and opening switch 12 providing no external charger is connected. The use of the two active signals ENABLE_CLK and the ENABLE_D provide some measure of protection against the load 18 accidentally activating the flip-flop U1 and thereby cutting off power to the device 8.

The switch 12 can also be commanded to the open state by a low voltage cut off circuit 26. The comparator U2 and the low voltage sense resistors R101 and R102 combine to form the low voltage cut off circuit 26. The low voltage sense resistors R101 and R102 are coupled to the battery 16 through transistor Q102 and sense the rechargeable battery's 16 voltage. The comparator U2 compares the voltage across low voltage sense resistor R102 with a reference voltage Vret. If the battery 16 voltage falls too low, which, in turn, drives the voltage across the low voltage sense resistor R102 below the reference voltage Vref, the low voltage cut-off circuit 26 generates a low voltage signal on the PR (pre-set) signal input on flip-flop U1. When the PR signal input on the flip-flop U1 is driven low, the Q output of the flip-flop U1 transitions to a high state which, in turn, switches the transistors Q101 and Q102 off. As a result, the switch 12 is opened and the battery 16 is disconnected from the L_BAT signal and the load 18.

The diode D2 ensures that both the transistors Q101 and Q102 are turned on when the device 8 is connected to the charger 20 and overrides the turn-off signal from the low voltage cut-off circuit 26. When the START_N signal is held low, the diode D2 pulls the gate of transistors Q101 and Q102 low thereby causing the transistors Q101 and Q102 to conduct even when the lithium battery 16 voltage is low enough to trigger the low voltage cut-off circuitry 26 to generate a low PR signal.

The switch controllers 14 described above with reference to FIGS. 2 and 3 are a preferred way of implementing the switch controller 14. It is understood that one of ordinary skill in the art could use other elements or arrangements such as logic arrays, programmable logic, micro-controllers, microprocessors, discrete logic gates, discrete analog components or others to construct the switch controller 14 without departing from the spirit of the invention.

For clarity, it is to be understood that the charger and the external power supply may be physically positioned outside the device. For instance, in the second embodiment, it is envisioned that an external power source may be incorporated within an external charger. The external power source-charger combination could be in the form of a power docking cradle. The cradle may then be portable. Hence, the internal rechargeable battery in the device may be charged when placed into the external cradle.

Having described in detail the preferred embodiments of the present invention, including preferred modes of operation, it is to be understood that this invention and operation could be constructed and carried out with different elements and steps. The preferred embodiments are presented only by way of example and are not meant to limit the scope of the present invention which is defined by the following claims.

What is claimed:

1. A battery disconnect system for a device having a battery and a load, the battery disconnect system comprising:
   (a) a switch configured to be coupled between the battery and the load and having a first state and a second state, said switch being operative to connect the battery to the load when in said second state, said switch also being operative to disconnect the battery from the load when in said first state; and
   (b) a switch controller coupled to said switch, said switch controller having an input for receiving a first signal from a first external source and for receiving a second signal from a second external source, said switch controller being operative to cause said switch to enter said second state in response to said first signal, said switch controller also being operative to cause said switch to enter said first state in response to said second signal, and wherein the first external source is a second battery.

2. The battery disconnect system according to claim 1 wherein the second external source is the load.

3. The battery disconnect system according to claim 1 wherein the second signal is a logic signal.

4. The battery disconnect system according to claim 1 wherein said switch comprises a MOSFET device.

5. The battery disconnect system according to claim 1 wherein said switch comprises a BJT device.

6. The battery disconnect system according to claim 1 wherein said switch comprises an IGBT device.

7. The battery disconnect system according to claim 1 wherein said switch controller is operative to cause said switch to enter said first state in response to a low energy level signal from the battery.

8. The battery disconnect system according to claim 1 further comprising the battery and wherein said battery is a rechargeable battery.

9. A device comprising:
   (a) a battery for providing power;
   (b) a load for using power provided by said battery;
   (c) a switch coupled between said battery and said load and having a first and a second state, said switch being operative to connect said battery to said load when in said second state, said switch also being operative to disconnect said battery from said load when in said first state wherein the load is not provided with power when said switch is in the first state; and
   (d) a switch controller coupled to said switch, said switch controller having an input for receiving a first signal from a first source and a second signal from a second source, said switch controller being operative to cause said switch to enter said second state in response to said first signal wherein the first signal provides an indication that an external power source has been coupled to the device, said switch controller also being operative to cause said switch to enter said first state in response to said second signal.

10. The device according to claim 9 wherein the external power source is a second battery.

11. The device according to claim 9 wherein the external power source is an AC power source.

12. The device according to claim 9 wherein the second source is said load and wherein said switch controller causes said switch to enter the second state in response to the second signal from said load.

13. The device according to claim 12 wherein the second signal is a logic signal.

14. The device according to claim 9 wherein said switch comprises a MOSFET device.

15. The device according to claim 9 wherein said switch comprises a BJT device.

16. The device according to claim 9 wherein said switch comprises an IGBT device.

17. The device according to claim 9 wherein said switch controller is operative to cause said switch to enter said first state in response to a low energy level signal from said battery.

18. The device according to claim 9 wherein the device is a pager.

19. The device according to claim 9 wherein the device is a cellular phone.

20. The device according to claim 9 wherein the device is an electric tool.

21. The device according to claim 9 wherein said battery is a rechargeable battery.

22. The device according to claim 21 further comprising a charger that is coupled to said rechargeable battery when said switch is in said second state and that is not coupled to said rechargeable battery when said switch is in said first state, said charger being operative to direct energy to said rechargeable battery.

23. A battery disconnect system for a device having a battery and a load, said battery disconnect system comprising:
   (a) switching means for disconnecting the battery from the load in a first operating state and for connecting the battery to the load in a second operating state wherein the load is not provided with power when said switching means is in the first operating state; and
   (b) switch controller means operatively coupled to said switching means for causing said switching means to enter said second operating state in response to a first signal from a first source wherein the first signal provides an indication that an external power source has been coupled to the device and for causing said switching means to enter said first operating state in response to a second signal from a second source.

24. A device comprising:
   (a) a battery for providing power
   (b) a load for using power provided by said battery;
   (c) switching means for disconnecting said battery from said load in a first operating state and for connecting said battery to said load in a second operating state wherein the load is not provided with power when said switching means is in the first operating state; and
   (d) switch controller means operatively coupled to said switching means for causing said switching means to enter said second operating state in response to a first signal from a first source wherein the first signal provides an indication that an external power source has been coupled to the device and for causing said switching means to enter said first operating state in response to a second signal from a second source.

25. A method for controlling the operating environment of a rechargeable battery in an electronic device having a load and wherein the rechargeable battery is the direct source of power to the load, comprising the steps of:
(a) providing a switch in the device that is operative to electrically couple the load to the rechargeable battery when in a second state, the switch also being operative to electrically decouple the load from the rechargeable battery when in a first state;
(b) charging the rechargeable battery;
(c) placing said switch in the first state thereby electrically disconnecting the rechargeable battery from the load after the rechargeable battery has been at least partially charged so the load does not drain the battery after the battery has been charged;
(d) electrically coupling an external power source to the device;
(e) detecting the coupling of said external power source to the device; and
(f) placing said switch in the second state whereby the rechargeable battery is electrically connected to the load in response to detecting the coupling of said external power source to the device.

26. The method of claim 25 wherein the step of placing said switch in a state that electrically disconnects the rechargeable battery from the load takes place in response to the occurrence of at least one condition of a set of pre-defined conditions.

27. The method of claim 25 wherein said condition is the elevation of the rechargeable battery's temperature beyond a preset level.

28. The method of claim 25 wherein said condition is the disconnection of said external power source from the device for a period of time exceeding a preprogrammed duration of time.

29. The method of claim 25 wherein said condition is the failure of said external power source for a period of time exceeding a preprogrammed duration of time.

30. The method of claim 25 wherein said condition is the falling of the rechargeable battery's energy capacity level below a predetermined level.

31. The method of claim 25 wherein said condition is the appearance of a user inputted signal.

32. The method of claim 25 further comprising the step of providing the electronic device.

33. The method of claim 32 wherein said electronic device is a wireless communications device.

34. The method of claim 33 wherein said wireless communications device includes an antenna and communications circuitry.

35. A rechargeable battery system for an electronic device having a load and a rechargeable battery and wherein the rechargeable battery is the direct source of power to the load, the system comprising:
(a) an electronically controllable switch operable to place the rechargeable battery system into a first state or a second state wherein the rechargeable battery is not electrically connected to the load when the rechargeable battery system is in said first state and wherein the rechargeable battery is electrically connected to the load when the rechargeable battery system is in said second state;
(b) a switch controller operable to signal said switch to place the rechargeable battery system into one of said first state or said second state in response to the occurrence of at least one condition of a set of pre-defined conditions;
(c) an external power source connection point that allows an external power source to be coupled to the device so that the external power source can charge the rechargeable battery; and
(d) wherein the set of pre-defined conditions for causing the switch controller to signal said switch to place the rechargeable battery system into said first state is a set of disconnection conditions and includes at least an occurrence of at least one of the following conditions: (i) the passage of a pre-determined period of time after said external power source is decoupled from the device, and (ii) the passage of a pre-determined period of time after the output power level of said coupled external power source falls below a predetermined level.

36. The system according to claim 35 wherein said occurrence of at least one condition is the passage of a pre-determined period of time after said external power source is decoupled from the device.

37. The system according to claim 35 wherein said occurrence of at least one condition is the passage of a predetermined period of time after the output power level of said coupled external power source falls below a predetermined level.

38. The system according to claim 35 wherein said occurrence of at least one condition is the occurrence of a rechargeable battery temperature that exceeds a preset level.

39. The system according to claim 35 wherein said occurrence of at least one condition is the falling of the rechargeable battery's energy capacity level below a predetermined level.

40. The system according to claim 35 wherein said occurrence of at least one condition is the occurrence of a user-inputted signal.

41. A battery disconnect system for a device having a battery and a load, the battery disconnect system comprising:
(a) a power source for providing power to the load, said power source comprising a first source of power and a first input for a second source of power, said first source of powering being the battery;
(b) a switch for coupling between said power source and the load and having a first state and a second state, said switch being operative to connect said power source to the load when in said second state, said switch also being operative to disconnect said power source from the load when in said first state; and
(c) a switch controller coupled to said switch, said switch controller having a second input, said switch controller being operative to cause said switch to enter said second state in response to a first input condition at said second input, said switch controller also being operative to cause said switch to enter said first state in response to a second input condition at said second input wherein the first input condition is the detection of the application of the second source of power.

42. The battery disconnect system according to claim 41 wherein the second source of power is a second battery.

43. The battery disconnect system according to claim 41 wherein the second source of power is an AC power source.

44. The battery disconnect system according to claim 41 wherein the second state is a conducting state and the first state is a non-conducting state.

45. The battery disconnect system according to claim 41 wherein the first input condition is the receipt of a signal from the second source of power.

46. The battery disconnect system according to claim 41 wherein the second input condition is the receipt of a signal from the first source of power.

47. The battery disconnect system according to claim 41 wherein the second input condition is the receipt of a low energy level signal from the battery.

48. The battery disconnect system according to claim 41 wherein the second input condition is the receipt of a signal from the load.

49. The battery disconnect system according to claim 48 wherein the signal from the load is a logic signal.

50. The battery disconnect system according to claim 41 wherein said battery is a rechargeable battery.

51. A device comprising:
(a) a battery for providing power;
(b) a load for using power provided by said battery;
(c) a switch coupled between said battery and said load and having a first and a second state, said switch being operative to connect said battery to said load when in said second state, said switch also being operative to disconnect said battery from said load when in said first state wherein the load is not provided with power when said switch is in the second state; and
(d) a switch controller coupled to said switch, said switch controller having an input for receiving a first signal from a first external source and a second signal from a second source wherein the first external source is a second battery, said switch controller being operative to cause said switch to enter said second state in response to said first signal, said switch controller also being operative to cause said switch to enter said first state in response to said second signal.

52. A method for controlling the operating environment of a rechargeable battery in an electronic device having a load and wherein the rechargeable battery is the direct source of power to the load, the method comprising the steps of:
(a) providing a switch in the device that is operative to electrically decouple the load from the rechargeable battery when in a first state, the switch also being operative to electrically couple the load to the rechargeable battery when in a second state;
(b) electrically coupling an external power source to the device;
(c) charging the rechargeable battery;
(d) placing said switch in the second state thereby electrically connecting the rechargeable battery to the load in response to detecting the coupling of said external power source to the device;
(e) electrically decoupling said external power source from the device; and
(f) placing said switch in the first state thereby electrically disconnecting the rechargeable battery from the load in response to detecting the disconnection of said external power source from the device for a period of time exceeding a preprogrammed duration of time.

53. A method for controlling the operating environment of a rechargeable battery in an electronic device having a load and wherein the rechargeable battery is the direct source of power to the load, the method comprising the steps of:
(a) providing a switch in the device that is operative to electrically decouple the load from the rechargeable battery when in a first state, the switch also being operative to electrically couple the load to the rechargeable battery when in a second state;
(b) electrically coupling an external power source to the device;
(c) charging the rechargeable battery;
(d) placing said switch in the second state thereby electrically connecting the rechargeable battery to the load in response to detecting the coupling of said external power source to the device; and
(e) placing said switch in the first state thereby electrically disconnecting the rechargeable battery from the load in response to detecting the failure of said external power source for a period of time exceeding a preprogrammed duration of time.

54. A rechargeable battery system for an electronic device having a load and a rechargeable battery and wherein the rechargeable battery is the direct source of power to the load, the system comprising:
(a) an electronically controllable switch operable to place the rechargeable battery system into a first state or a second state wherein the rechargeable battery is not electrically connected to the load when the rechargeable battery system is in said first state and wherein the rechargeable battery is electrically connected to the load when the rechargeable battery system is in said second state;
(b) a switch controller operable to signal said switch to place the rechargeable battery system into one of said first state or said second state in response to the occurrence of at least one condition of a set of predefined conditions;
(c) an external power source connection point that allows an external power source to be coupled to the device so that the external power source can charge the rechargeable battery; and
(d) wherein said occurrence of at least one condition is the passage of a predetermined period of time after said external power source is decoupled from the device.

55. A rechargeable battery system for an electronic device having a load and a rechargeable battery and wherein the rechargeable battery is the direct source of power to the load, the system comprising:
(a) an electronically controllable switch operable to place the rechargeable battery system into a first state or a second state wherein the rechargeable battery is not electrically connected to the load when the rechargeable battery system is in said first state and wherein the rechargeable battery is electrically connected to the load when the rechargeable battery system is in said second state;
(b) a switch controller operable to signal said switch to place the rechargeable battery system into one of said first state or said second state in response to the occurrence of at least one condition of a set of predefined conditions;
(c) an external power source connection point that allows an external power source to be coupled to the device so that the external power source can charge the rechargeable battery; and
(d) wherein said occurrence of at least one condition is the passage of a predetermined period of time after said external power source is decoupled from the device.

* * * * *

UNITED STATES PATENT AND TRADEMARK OFFICE
CERTIFICATE OF CORRECTION

PATENT NO.    : 6,271,605 B1
DATED         : August 7, 2001
INVENTOR(S)   : Steven Carkner, Quang Luong, Jonathan Malton, Robert Lowles, Carl Schaaff and Daniel Fischer It is certified that error appears in the above-identified patent and that said Letters Patent is hereby corrected as shown below:

Column 11,
Lines 34, 37, 41, 44, 47 and 49, change "claim 25" to -- claim 26 --.

Signed and Sealed this

Sixteenth Day of July, 2002

*Attest:*

*Attesting Officer*

JAMES E. ROGAN
*Director of the United States Patent and Trademark Office*